No. 793,693. PATENTED JULY 4, 1905.
R. THOMPSON.
ANIMAL HOLDER.
APPLICATION FILED AUG. 5, 1904.
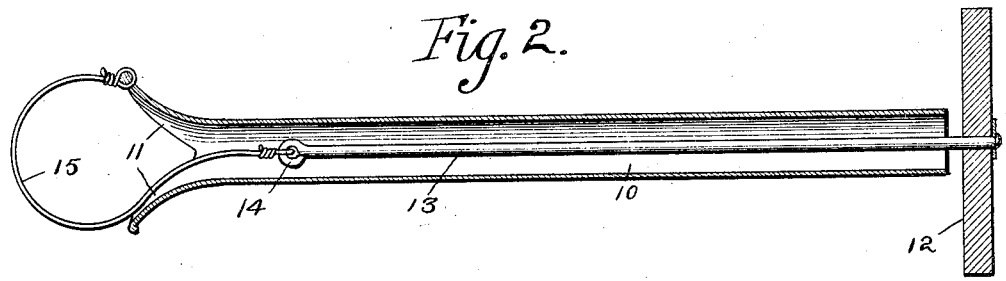
Fig. 2.
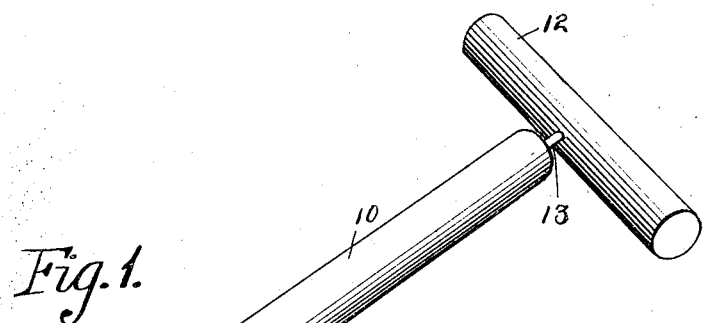
Fig. 1.
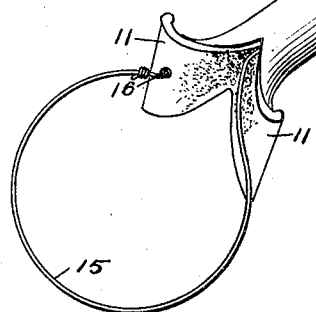
Witnesses
A. G. Hague
L. L. Feibrock
Inventor Robert Thompson.
By Orwig & Lane Attys No. 793,693. Patented July 4, 1905.

UNITED STATES PATENT OFFICE.

ROBERT THOMPSON, OF NEWTON, IOWA.

ANIMAL-HOLDER.

SPECIFICATION forming part of Letters Patent No. 793,693, dated July 4, 1905.

Application filed August 5, 1904. Serial No. 219,623.

*To all whom it may concern:*

Be it known that I, ROBERT THOMPSON, a citizen of the United States, residing at Newton, in the county of Jasper and State of Iowa, have invented a new and Improved Animal-Holder, of which the following is a specification.

The objects of my invention are to provide a device of this class of simple, durable, and inexpensive construction especially designed for catching and holding hogs by providing a loop which may be placed over the animal's nose and then drawn tight to securely hold the animal.

More specifically it is my object to provide a device of this class in which the body portion may be made of a single piece of metal tubing having one end provided with a central longitudinal cut and the sides curved outwardly and flattened to form a flaring and rounded end to rest against one side of the animal's nose.

My invention consists in certain details in the construction, arrangement, and combination of the various parts of the device whereby the objects contemplated are attained, as hereinafter more fully set forth, pointed out in my claim, and illustrated in the accompanying drawings, in which—

Figure 1 shows the entire device in perspective, and Fig. 2 shows a central longitudinal sectional view of same.

Referring to the accompanying drawings, I have used the reference-numeral 10 to indicate the tubular body portion of the device. This is open at both ends and one end thereof is formed to rest against one side of an animal's nose by forming a central longitudinal cut in the end of the tube and then bending the opposite sides outwardly and flattening them at their ends, thus forming two flat faces 11, parallel with each other and flared outwardly from the center of the tube.

The handle is indicated by the reference-numeral 12, and a rigid rod 13 is fixed to the center of the handle, passed through the hollow tube, and provided with an eye 14 in its opposite end. This rod is of such a length that when the handle 12 is close to the end of the tube 10 the said eye 14 will be a short distance from the opposite end of the tube, as clearly shown in Fig. 2.

The reference-numeral 15 indicates a wire loop having one end attached to one of the flaring sides 11 by being passed through an opening 16 therein, and the other end of the wire is inserted in the adjacent end of the tube and attached to the eye 14. This wire is preferably spring metal, so that it will be flexible and yet rigid enough to maintain its position in the form of a loop, and I have found that the grade of wire commonly called "piano-wire" is admirably adapted for this purpose. By providing the flat flaring portion 11 on the side opposite from the side to which the wire is attached the wire is permitted to slide freely over said part 11, and when the handle 12 is moved to and from the tube the loop 15 is contracted and expanded and always kept in circular form.

In practical use and assuming it is desired to catch and hold an animal, such as a hog, the operator grasps the tube 10 in one hand, the handle 12 in the other, the handle being placed against the adjacent end of the tube, thus making the loop 15 as large as possible. The operator then approaches the animal and places the loop 15 over the animal's nose, and then by a quick outward movement of the handle 12 the loop 15 is contracted in size until it closely fits over the end of the animal's nose. In this way the loop passes over the animal's nose and the flared ends 11 of the tube 10 engage the animal's nose, and as these sides 11 are flat and have no sharp edges the animal will not be injured in any way and yet will be firmly held so long as the operator pulls outwardly on the handle 12. In order to release the animal, it is only necessary to push the handle 12 toward the tube 10, whereupon the spring-loop 15 is enlarged and may then be withdrawn from the animal's nose.

Having thus described my invention, what I claim, and desire to secure by Letters Patent of the United States therefor, is—

An improved animal-holder, comprising a hollow metal tube having one end provided with a longitudinal cut and having the opposite sides of said end curved outwardly away from each other and flattened near their outer ends, one of said sides being provided with an opening near its outer end, a spring-wire passed through said opening and attached to said side with its other end inserted in the adjacent end of the tube, a rod slidingly mounted on the interior of the tube and having the end of said wire attached thereto, and a handle on the opposite end of said rod, all arranged and combined substantially in the manner set forth and for the purposes stated.

ROBERT THOMPSON.

Witnesses:
O. C. MEREDITH,
F. E. MEREDITH.